July 1, 1958 R. L. ABOS ET AL 2,841,286
WATER SOFTENER

Filed April 14, 1955 4 Sheets-Sheet 2

RALPH L. ABOS
RAMON L. ABOS
CARL A. STUEWE
INVENTORS

BY Hazard & Miller
ATTORNEYS

July 1, 1958 R. L. ABOS ET AL 2,841,286
WATER SOFTENER
Filed April 14, 1955 4 Sheets-Sheet 3

RALPH L. ABOS
RAMON L. ABOS
CARL A. STUEWE
INVENTORS

BY Hazard & Miller
ATTORNEYS

July 1, 1958 R. L. ABOS ET AL 2,841,286
WATER SOFTENER

Filed April 14, 1955 4 Sheets—Sheet 4

RALPH L. ABOS
RAMON L. ABOS
CARL A. STUEWE
INVENTORS

BY Hazard & Miller

ATTORNEYS

United States Patent Office 2,841,286
Patented July 1, 1958

2,841,286

WATER SOFTENER

Ralph L. Abos, Ramon L. Abos, and Carl A. Stuewe, Whittier, Calif.

Application April 14, 1955, Serial No. 501,348

1 Claim. (Cl. 210—278)

This invention relates to improvements in water softeners.

An object of the invention is to provide a relatively simple, compact water softener that can be connected to a hard water source of supply and which will deliver softened water. The water softener embodying the present invention is particularly useful in softening water that is delivered to washers of various kinds, such as, clothes washers, dishwashers, and the like, but may be used for other and similar purposes.

More specifically, an object of the invention is to provide a water softener consisting of a tank having a hard water inlet and a soft water outlet with the tube extending downwardly into the tank having a filter or strainer at its bottom between the tube and the tank. Ion exchange resins, artificial or natural zeolites, or the like can be positioned in the tank about the tube. The tube is connectable at its upper end to the soft water outlet so that in the normal course of operation the hard water is caused to pass downwardly through the tank and through the ion exchange resins, then through the strainer and upwardly through the tube to the soft water outlet.

It is well known in water softeners that the ion exchange resins must be regenerated from time to time and salt brine is generally used for this purpose. The present invention, however, includes a removable or openable closure at the top of the tube whereby salt in solid condition can be placed in the tube and water flow in a reverse direction can be caused to take place. In this reverse direction, incoming hard water is caused to flow downwardly through the tube and to dissolve the solid salt before passing through the filter or strainer. The salt solution is then caused to pass upwardly through the ion exchange resins to regenerate them and to a drain. In this manner the use of a brine tank or a previously prepared brine can be avoided.

The drain from the water softener during such regeneration is frequently located at a higher level than the top of the water softener itself. Thus, the drain hose from the water softener may be hooked over the edge of a laundry tub, which edge is higher than the top of the water softener. If this occurs and the drain hose is filled with liquid, the static head of water in the drain may be such as to cause water in the tube to overflow from its top when the closure at the top of the tube is removed or opened for the purpose of introducing the salt. It is, therefore, a further object of the invention to provide a water softener having the above-mentioned characteristics wherein a three-way control valve is used which in one position will cause normal flow to take place from the hard water inlet to the water softener to the soft water outlet; another position wherein flow will take place from the hard water inlet through the water softener in a reverse direction to the drain; and a third position wherein a jetting or siphoning action is induced by flow from the hard water inlet to the drain so that the level of water in the tube can be artificially depressed or lowered when the closure at the top of the tube is removed for the purpose of introducing the salt. In this manner, overflow from the top of the tube during the period that the salt is introduced can be completely eliminated.

With the foregoing and other objects in view, which will be made manifest in the following detailed description and specifically pointed out in the appended claim, reference is had to the accompanying drawings for an illustrative embodiment of the invention, wherein:

Fig. 6 is a vertical section illustrating the water softener in that condition wherein the closure at the top of the tube has been removed for the purpose of introducing the salt and illustrating the water level therein as having been depressed by the siphoning action;

Figure 1:
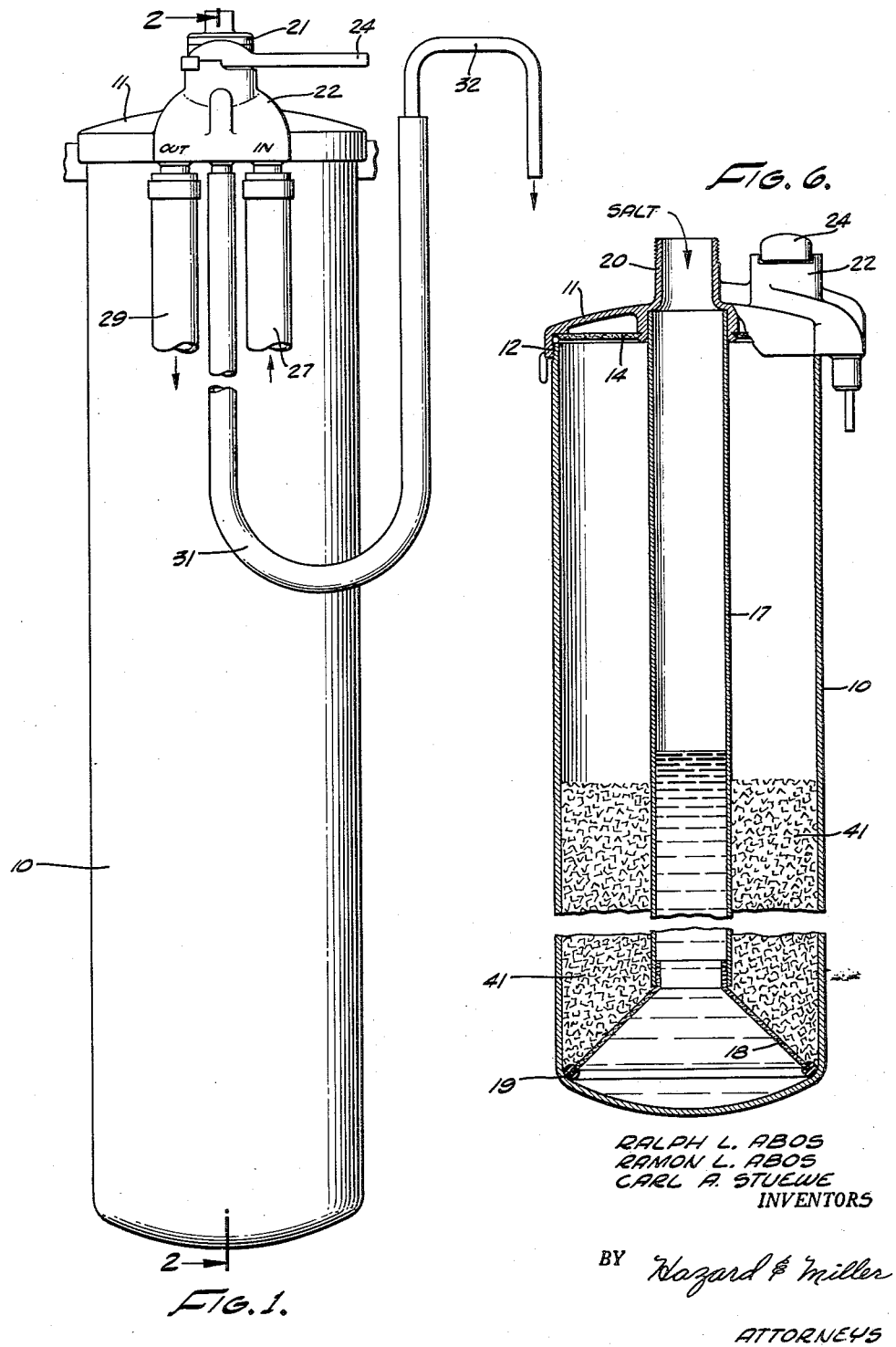
Figure 1 is a view in side elevation of the water softener, embodying the present invention.

Referring to the accompanying drawings wherein similar reference characters designate similar parts throughout, the improved water softener comprises a tank 10 having a cap or upper head 11 removably mounted thereon, such as by a threaded connection therewith indicated at 12. On the top edge of the tank there is a rubber gasket or equivalent sealing means, indicated at 13, on which rests an upper filter or strainer 14. This strainer is centrally mounted on a central boss 15 formed on the underside of the cap 11, there being an external shoulder against which the strainer is positioned and against which it is held in place, such as by outwardly flaring or peening the metal, as at 16. A tube 17 has its upper end fitting within the boss 15 and extends downwardly within the tank 10 to a point near the bottom thereof. The bottom of the tube 17 is equipped with a filter or strainer 18 and this filter or strainer preferably flares outwardly toward the walls of the tank and is equipped with a rubber gasket 19 which engages the tank.

The two strainers or filters 14 and 18 are preferably formed of powdered metal, such as, for example, powdered bronze. The powdered particles of the bronze are quite small and are substantially spherical in form. These particles are equipped with small coatings of tin and the powder is poured in a mold, giving the powder the proper shape. On heating the powder to a sintering temperature the tin coating functions as a binder, binding the powder particles together, but the interstices between the substantially spherical powder particles permit liquids to pass therethrough with a straining or filtering action.

On the top of the cap 11 in alignment with the tube 17 there is a nipple 20 externally threaded to receive a removable cap or closure 21. The cap or head 11 is also formed to provide a housing 22 for a rotary valve 23 which can be rotated into three optional positions by means of a crank or handle 24. A duct 25 forms part of the valve housing and leads to the nipple 20 at the top of the tube 17. Another duct 26 is provided with a nipple to which a hose 27 may be connected that in turn is connected to a hard water source of supply. A duct 28 has a nipple to which a hose 29 may be connected which in turn may be connected to a washer, such as, a clothes washer or a dishwasher. This duct and its nipple constitute the soft water outlet from the water softener. Another duct 30 leads to a nipple to which a drain hose 31 is connected. This drain hose is preferably equipped at its end with a U-shaped metallic nozzle 32 that can be hooked over a suitable drain such as, for example, a laundry tub. A duct 33 is also formed in the valve housing and leads to the interior of a small section of tubing 34 that is located within the duct 30 and which extends downwardly through the nipple that is connected to the drain hose 31.

Figure 8:
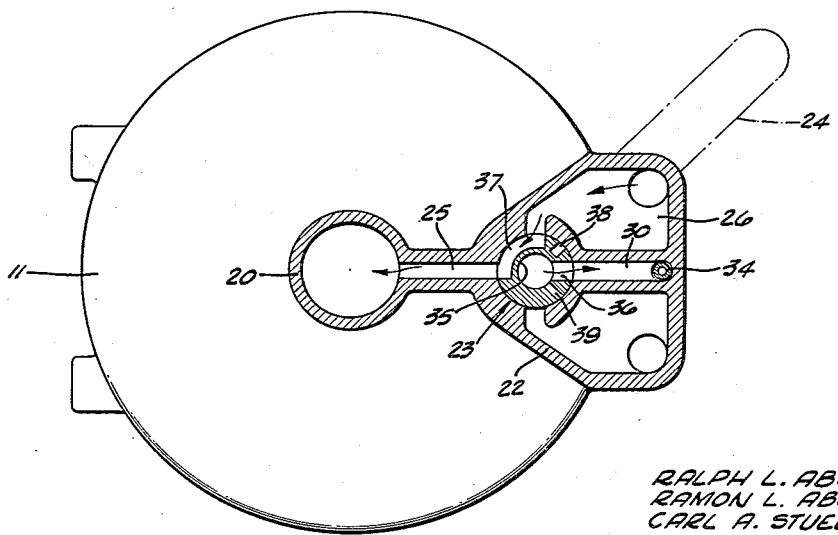
Fig. 8 is a horizontal section taken substantially upon the line 8—8 upon Fig. 7.

The rotary valve 23 has a vertical central bore 35 which communicates with a port 36 that can be brought into registration with either the inlet duct 26 or the drain duct 30. Compare Figs. 3 and 8. On the exterior of the valve 23 there is a horizontally extending groove 37 which in the position shown in Fig. 3 connects duct 25 with the outlet duct 28 and which in the position shown in Fig. 8 connects the inlet duct 26 with duct 25 for the purpose of enabling back flow or reverse flow through the water softener. Also on the exterior of the valve 23 there is an angular groove, the vertical leg of which is indicated at 38 and which is arranged between groove 37 and port 36. This vertical leg is connected at its top with a horizontal groove 40 which can be caused to register with duct 33. In the valve there is also formed a port 39 which can be caused to register with the duct 30.

Ion exchange resins, indicated at 41, are placed in the tank above the strainer or filter 18 and around the tube 17.

Figure 2:
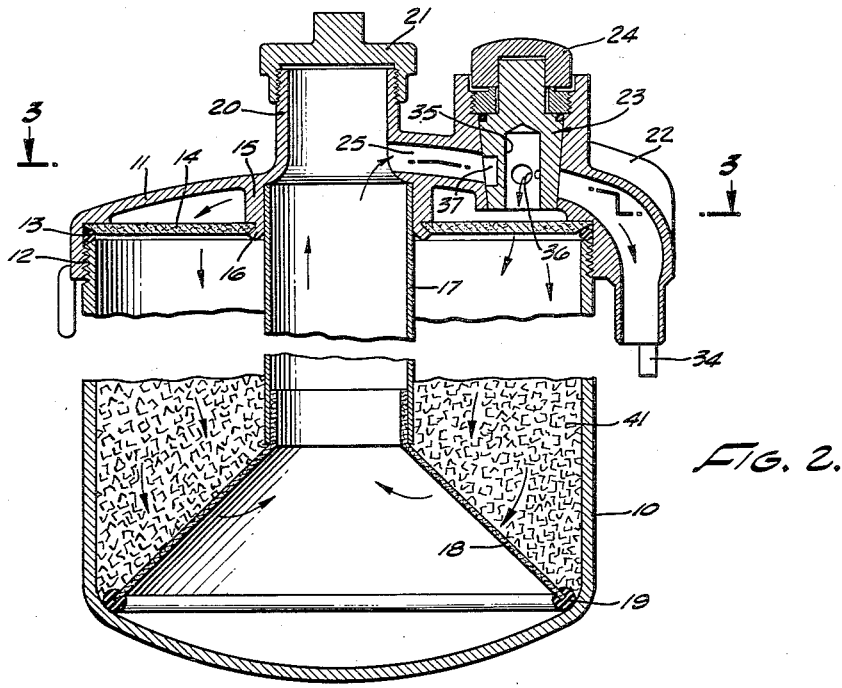
Fig. 2 is a vertical section taken substantially upon the line 2—2 upon Fig. 1, portions of the tank and tube being shown as having been broken away and removed.
Figure 3:
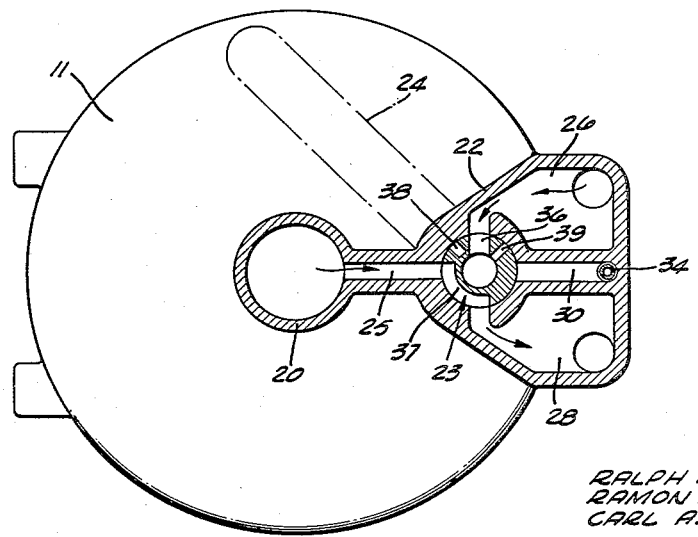
Fig. 3 is a horizontal section taken substantially upon the line 3—3 upon Fig. 2, and showing the three-way valve in that position for normal operation.

During normal operation the valve is in the position shown in Figs. 2 and 3 wherein hard water from a source of supply is conducted through the water softener through the hose 27. From this hose the hard water enters duct 26, flows through port 36 to the vertical central bore 35. It is then caused to flow downwardly through the filter or strainer 14 and through the ion exchange resins 41, so as to be softened thereby. The softened water then passes through the filter or strainer 18 and upwardly through the tube 17 where it enters the duct 25, passes through the groove 37 to the soft water outlet provided by duct 28 and hose 29.

Figure 4:
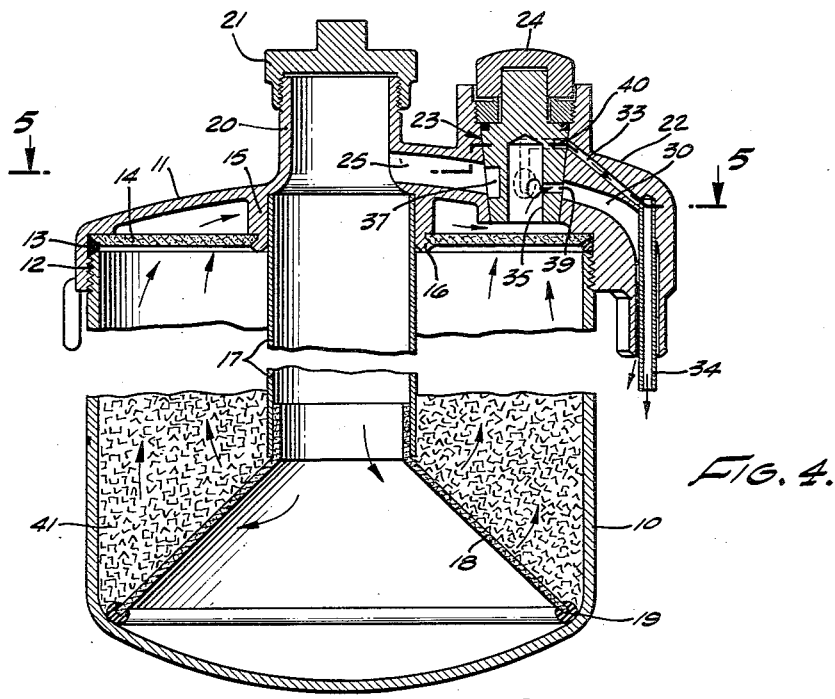
Fig. 4 is a view similar to Fig. 2, but illustrating the valve in that position wherein siphoning action is developed in the drain for the purpose of depressing or lowering the water level in the tube upon opening the closure at the top of the tube for the purpose of introducing the salt.
Figure 5:
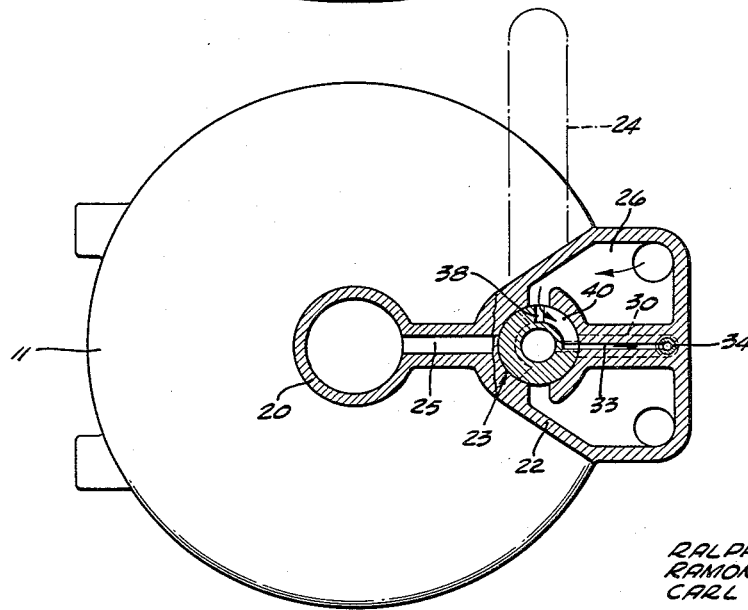
Fig. 5 is a horizontal section taken substantially upon the line 5—5 upon Fig. 4.

As previously explained, the nozzle 32 may be hooked over the edge of a laundry tub or may be disposed at some elevation substantially higher than the top of the water softener. When it is desired to regenerate the ion exchange resins 41, the valve is turned to the position shown in Figs. 4 and 5. In this position hard water from the inlet duct 26 is conducted by the angular groove having the vertical leg 38 and the horizontal leg 40 to the duct 33. From duct 33 this hard water is discharged downwardly through the tubing 34 at high velocity, this tubing being in small spaced relation to the walls of the duct 30. In this position of the valve also the port 39 is in registration with the duct 30. The water which discharges through the tubing 34 has a jetting or aspirating effect attempting to induce flow through the duct 30 and thus siphon out water that is in the tank. When the closure cap 21 is removed permitting air to enter the nipple 20 and the top of the tube 17, this jetting or aspirating action is effective to artificially depress or lower the liquid level of water in the tube 17. In this manner, there is no danger of water overflowing the top of the nipple 20 on removal of the cap 21, although the height of the nozzle 32 is substantially above the top of the water softener.

Figure 7:
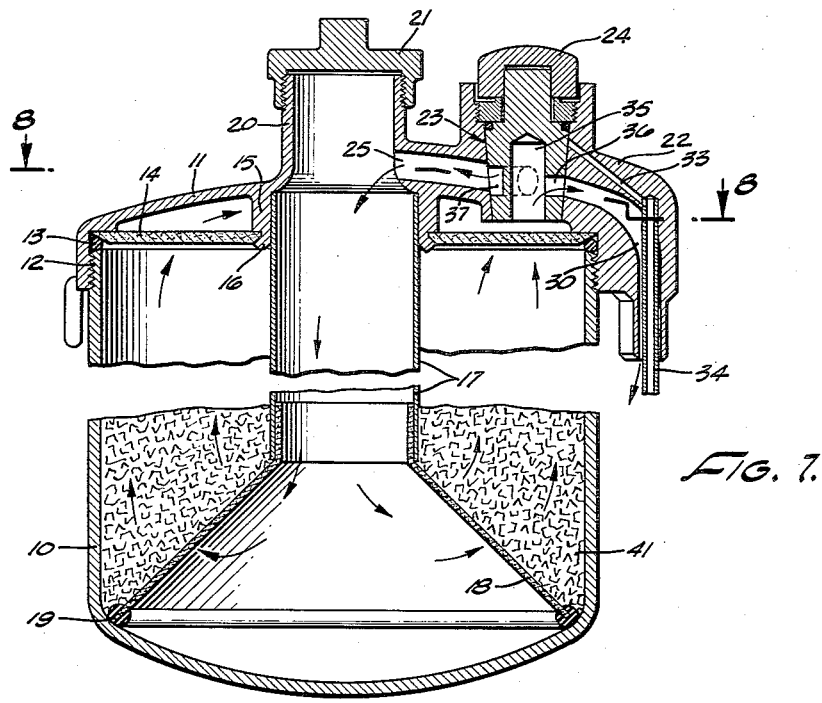
Fig. 7 is a view similar to Fig. 2, but illustrating the valve in that position wherein reverse flow through the water softener is taking place for the purpose of dissolving the salt and regenerating the ion exchange resins.

The cap 21 having been removed and the water level in the tube 17 having been thus artificially depressed, as illustrated in Fig. 6, salt in solid form can be poured into the nipple 20. As salt in solid form can be employed the necessity of using a brine tank or preparing a brine can be avoided. The salt in solid form settles downwardly through the tube 17 to the bottom of the tank and the closure cap 21 is then replaced. The valve is then turned to the position shown in Figs. 7 and 8 wherein water supplied to the inlet duct 26 is conducted through groove 37 to duct 25 and is caused to flow downwardly through the tube 17. This water dissolves the solid salt and the brine produced by such solution flows through the strainer 18 in a reverse direction and upwardly through the ion exchange resins 41, regenerating them. The brine also flows upwardly through the filter or strainer 14 into the bottom of the bore 35 through port 36 to the drain duct 30 and is ultimately discharged through the drain nozzle 32. When the salt has been completely dissolved and the ion exchange resins have been regenerated, water is allowed to continue to flow in this reverse direction until the tank has been emptied of brine. The valve is then returned from the position shown in Fig. 8 to the normal position shown in Fig. 3, wherein hard water from the source of supply is conducted through the valve downwardly through the filter or strainer 14, the regenerated ion exchange resins, the strainer or filter 18, upwardly through tube 17 and through duct 25 and groove 37 to the soft water outlet 28.

From the above-described construction it will be appreciated that the improved water softener is of relatively simple and of compact design. For regeneration purposes it is unnecessary to employ a brine tank or a previously prepared brine. In lieu, thereof, solid salt may be poured into the water softener through nipple 20 and the brine created in the softener itself. The solid salt is kept confined by the strainer or filter 18 until it has dissolved and only then is it permitted to pass through the ion exchange resins 41 for the purpose of regenerating. In opening the top of nipple 20 for the purpose of introducing the solid salt, it is immaterial whether the drain nozzle 32 is higher or lower than the top of the water softener in that the jetting or aspirating effect created in the drain outlet duct 30 by the water discharging through the tubing 34 causes a siphoning action to take place that will depress the water level in tube 17 so that no overflow of water from nipple 20 will occur while the salt is being poured in. In this manner, users of the water softener can dispense with previously prepared brines and brine tanks, use salt solid for regenerating purposes, and when introducing solid salt into the water softener there is no danger of water escaping or overflowing from the device.

Various changes may be made in the details of construction without departing from the spirit and scope of the invention as defined by the appended claim.

We claim:

A water softener comprising a tank having a hard water inlet, a soft water outlet and a drain outlet, a jet tube in the drain outlet, a tube extending downwardly into the tank, a strainer between the tube and the tank, said tube having a removable closure at the top thereof, a rotary valve controlling the inlet and the outlet, said rotary valve having one passage therethrough from the inlet to the interior of the tank and another passage from the top of the tube to the soft water outlet, said valve having a port adapted to connect the interior of the tank with the drain outlet, and a passage for connecting the inlet to the jet tube the passage initially connecting the tube to the soft water outlet being also capable of connecting the hard water inlet to the tube in the tank.

References Cited in the file of this patent
UNITED STATES PATENTS

| 426,918 | Churchill | Apr. 29, 1890 |
| 524,155 | Williamson | Aug. 7, 1894 |
| 1,677,891 | Green | July 24, 1928 |
| 1,929,405 | Bilde | Oct. 10, 1933 |
| 1,976,906 | Waldron | Oct. 16, 1934 |
| 2,462,154 | Barnes | Feb. 22, 1949 |
| 2,681,147 | Braswell | June 15, 1954 |